M. J. MOHR.
MIRROR SUPPORT.
APPLICATION FILED NOV. 4, 1918.

1,317,934.

Patented Oct. 7, 1919.

Magnus J Mohr
INVENTOR.

BY J. M. Thomas
ATTORNEY

UNITED STATES PATENT OFFICE.

MAGNUS J. MOHR, OF GARFIELD, UTAH.

MIRROR-SUPPORT.

1,317,934.  Specification of Letters Patent.  Patented Oct. 7, 1919.

Application filed November 4. 1918. Serial No. 261,167.

*To all whom it may concern:*

Be it known that I, MAGNUS J. MOHR, a citizen of Denmark, residing at Garfield, in the county of Salt Lake and State of Utah, have invented certain new and useful Improvements in Mirror-Supports, of which the following is a specification.

My invention relates to mirror supports, and has for its object to provide an efficient collapsible support for a mirror which may be carried on the body of a person desiring to use the mirror, whereby the mirror may be held in position for use.

These and other objects which will be apparent I accomplish with the device illustrated in the accompanying drawings in which similar letters and numerals of reference indicate like parts throughout the several figures, and as described in the specification forming a part of this application and pointed out in the appended claims.

Figure 1:
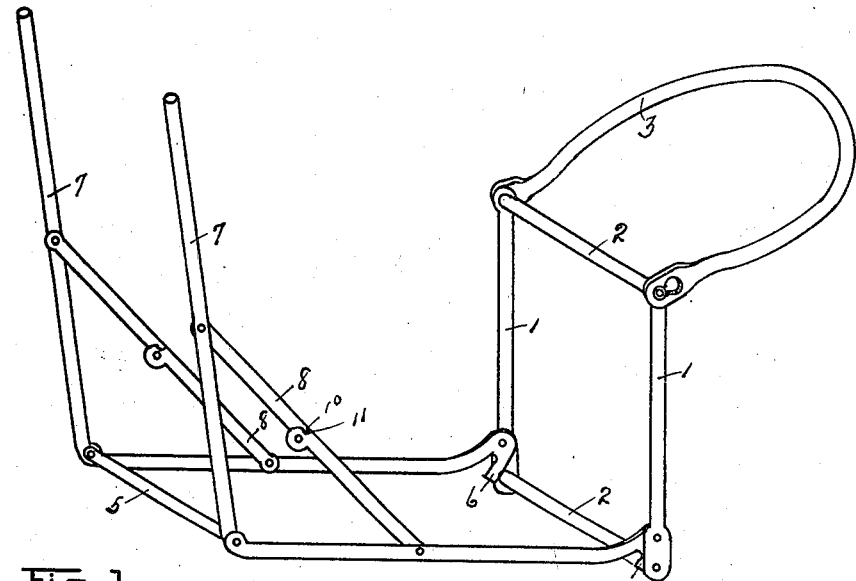
Figure 2:
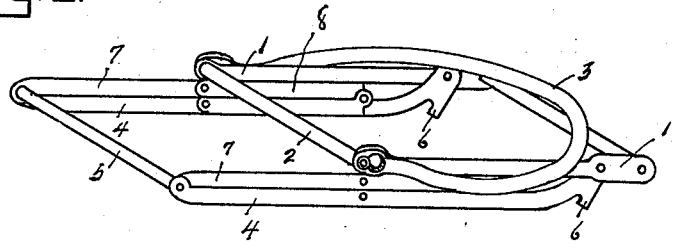
Figure 3:
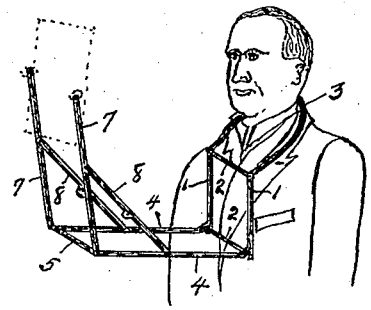

In the drawings in which I have shown a substantial embodiment of my invention, Figure 1 is a view in perspective of the device. Fig. 2 is a view in perspective of the device as collapsed. Fig. 3 is a view showing the device in place on the body of a person.

It is highly desirable at times to support a small mirror on the body of the person desiring to use the mirror, in such position that reflections from the mirror may be readily and clearly shown the wearer, in dressing, shaving and making the toilet in camps, on board moving trains, vessels and other vehicles of travel, and also in rooms in which the light is poor in certain positions and good in others.

The present invention supplies such support for a mirror and which is collapsible and occupies but limited space and consists of a collapsible frame made of light yet strong material which may be folded into compact form. The said frame has two spaced apart wires 1, stayed by the cross pieces 2, and suspended from the neck of the person desiring to use the mirror by the curved wire 3, which wire 3 is detachably secured at one end to one of said cross wires 2, to facilitate the use of the device. As will be obvious this suspending element may take the form of a flexible cord or strap. Pivotally attached to the lower portion of said wires 1 are two other wires 4, which are held in spaced apart relation to each other by the brace 5. Short projections 6 are integrally provided on each of said wires 4 which contact with the lower cross piece 2 when the device is in use. The pivotal connection of the said wires 4 with the wires 1 and the projections 6 is provided to allow compact folding of the parts and the projections 6 prevent said wires 4 from being moved on the connection to a position greater than a right angle or horizontally with the wearer. Two other wires 7 are pivotally connected with the outer end of said wires 4 and on which the mirror is to be mounted. Two medially hinged braces 8 are pivoted between the wires 4 and 7. The hinged brace 8 between each of said wires 7 and its respective connected wire 4 is used so that said wires 7 may be folded practically parallel with the said wires 4, and may be extended to a locked position slightly more than a right angle from said wires 4 when in use, one leaf of each hinge shown at 10 contacts with a shoulder 11 provided on the other leaf of said hinge.

As will be obvious, a single wire or support may be provided on which to mount the mirror in place of the said wires 7, and two wires crossed intermediately may be used instead of the wires 4 and cross brace 5, but applicant preferably constructs his device as shown as it holds the mirror more steady and admits of more compact folding when not in use.

Having thus described my invention I desire to secure by Letters Patent and claim:—

1. A mirror support comprising a rectangularly shaped wire frame; a wire having one end pivoted to a corner of said frame and bent to form a loop and having a slotted opening in its other end adapted to be detachably fastened on the adjacent corner of said frame as a neck engaging loop; another rectangularly shaped wire frame pivoted to the side pieces of said first mentioned frame; short extended portions of the side wires of the last mentioned frame bent at an angle to said side wires and adapted to limit the pivotal movement of said two frames to a quarter of a circle; mirror supporting wires pivoted at their lower ends to the corners of the second mentioned frame; and hinged braces between said mirror mounting wires and the side pieces of the second mentioned frame.

2. A mirror support comprising two wires having a portion of each flattened; cross wires to fasten the said wires into a rectangular frame, one of said cross wires extended at each end; a wire bent into a curve with one end pivoted on the extended portion of said cross wire last mentioned, and the other end having an elongated slot adapted to be engaged over the other extended portion to form a neck supporting loop; two short pieces of wire pivoted to the flattened portion of the first mentioned wires and with a portion of each bent at an angle to the body of the wire and adapted to engage one of said cross wires to limit the pivotal movement of the body of the wire; two mirror mounting wires pivoted at one end to the ends of the last mentioned wires; and brace wires having hinges medially therein pivoted at an angle between said mirror mounting wires and their connection to allow the device to fold into compact form.

In testimony whereof I have affixed my signature.

MAGNUS J. MOHR.

Copies of this patent may be obtained for five cents each, by addressing the "Commissioner of Patents, Washington, D. C."